United States Patent
Bogat

(10) Patent No.: US 7,184,747 B2
(45) Date of Patent: Feb. 27, 2007

(54) SYSTEM AND METHOD FOR IMPLEMENTING FINANCIAL TRANSACTIONS USING CELLULAR TELEPHONE DATA

(75) Inventor: Antonio Bogat, Duluth, GA (US)

(73) Assignee: NCR Corporation, Dayton, OH (US)

( * ) Notice: Subject to any disclaimer, the term of this patent is extended or adjusted under 35 U.S.C. 154(b) by 933 days.

(21) Appl. No.: 09/915,053

(22) Filed: Jul. 25, 2001

(65) Prior Publication Data
US 2003/0022655 A1 Jan. 30, 2003

(51) Int. Cl.
*H04M 11/00* (2006.01)
*G06F 17/60* (2006.01)

(52) U.S. Cl. .................. 455/406; 455/408; 705/16; 705/39; 705/40; 705/44

(58) Field of Classification Search ............... 705/39, 705/40, 38, 19, 26, 67, 16–17, 21, 34, 44; 455/405, 406, 407, 408; 379/114.01, 114.19, 379/114.2, 126, 127.01, 121.01
See application file for complete search history.

(56) References Cited

U.S. PATENT DOCUMENTS

| | | | | |
|---|---|---|---|---|
| 5,778,173 A * | 7/1998 | Apte | ............................ | 713/201 |
| 5,940,481 A * | 8/1999 | Zeitman | ....................... | 705/13 |
| 6,088,683 A * | 7/2000 | Jalili | ............................ | 705/26 |
| 6,195,541 B1 * | 2/2001 | Griffith | ........................ | 455/406 |
| 6,227,447 B1 * | 5/2001 | Campisano | ................. | 235/380 |
| 6,456,984 B1 * | 9/2002 | Demoff et al. | ................ | 705/40 |
| 6,473,739 B1 * | 10/2002 | Showghi et al. | ............... | 705/26 |
| 6,868,391 B1 * | 3/2005 | Hultgren | ....................... | 705/26 |
| 2002/0010678 A1 * | 1/2002 | Utsunomiya | ................. | 705/40 |
| 2002/0025796 A1 * | 2/2002 | Taylor et al. | ................ | 455/406 |
| 2002/0143634 A1 * | 10/2002 | Kumar et al. | .................. | 705/18 |
| 2002/0147658 A1 * | 10/2002 | Kwan | ............................ | 705/26 |
| 2002/0147913 A1 * | 10/2002 | Lun Yip | ....................... | 713/184 |
| 2002/0152179 A1 * | 10/2002 | Racov | ........................... | 705/67 |
| 2003/0010821 A1 * | 1/2003 | Silberberg | .................. | 235/382 |
| 2004/0076275 A1 * | 4/2004 | Katz | ........................ | 379/93.12 |
| 2005/0259797 A1 * | 11/2005 | Swatrz et al. | ............. | 379/93.12 |

* cited by examiner

*Primary Examiner*—Binh K. Tieu
(74) *Attorney, Agent, or Firm*—Maginot, Moore & Beck LLP

(57) ABSTRACT

A system and method provide access to a consumer's financial account without requiring a payment service token. The system supports transactions billed to an account associated with a cellular telephone with a merchant terminal for generating and sending merchant transaction data, a consumer data receiver for receiving consumer transaction data from a cellular telephone at the transaction site, and a transaction processor for processing the merchant transaction data and the consumer transaction data to access a financial account. This system is used to verify authorization to access the financial account for payment of a transaction. This system takes advantage of the almost ubiquitous presence of cellular telephones among the consuming public. The merchant terminal operates in a known manner to record data regarding items being purchased by a consumer and generates a total amount for the transaction. The total amount, a transaction code, and a telephone number for payment processing may then be displayed for the consumer. The consumer then uses his or her cellular telephone to call the displayed number and enter the transaction code. Substantially simultaneously with the display of this data, the merchant terminal sends merchant transaction data to the payment processing site. The consumer transaction data and the merchant transaction data are used to generate a transaction record and query a payment service for approval. The approval code may then be returned to the merchant terminal and consumer for appropriate completion of the transaction.

24 Claims, 3 Drawing Sheets

SYSTEM AND METHOD FOR IMPLEMENTING FINANCIAL TRANSACTIONS USING CELLULAR TELEPHONE DATA

FIELD OF THE INVENTION

This invention relates generally to methods and systems for implementing financial transactions and, more particularly, to methods and systems for implementing financial transactions without the use of transaction tokens.

BACKGROUND OF THE INVENTION

Financial transactions systems are typically used to provide a consumer with access to funds for a purchase of some sort. Many financial transaction systems are token based as they require the consumer to submit a token, usually in the form of a credit, debit, or smart card, that identifies a financial account associated with the consumer. A terminal associates the financial account data and the customer data stored in the token with transaction data to generate a transaction message. The transaction message is then transmitted via a communication network to a host system that validates the association of the account and customer data and generates an authorization message for the transaction. The authorization message is returned to the terminal and the terminal indicates whether the host system approved the transfer of funds from the account associated with the consumer to the entity from which the consumer is making a purchase. If the transaction is approved, the consumer acknowledges the transaction approval and receives the goods or services. Transactions supported by tokens granting access to financial accounts are a benefit to consumers because they reduce the need for consumers to carry cash and consumers are protected from unauthorized use of lost or stolen tokens if the consumer promptly notifies an account provider of the token loss.

In the financial transaction system discussed above, the consumer must carry a token for the specific purpose of implementing transactions. In fact, most consumers in western hemisphere countries carry multiple tokens in the event that the consumer desires to access a financial account. Multiple tokens are carried because a typical consumer has one or more credit and/or debit accounts with one or more financial institutions and may have more purchase accounts with one or more retailers. Carrying a plurality of financial tokens presents a number of problems for consumers. For one, loss of an infrequently used card may not be detected until the next opportunity arises for use of the token or a bill is received that indicates unauthorized use of the card is occurring. In either event, the notification period that relieves the consumer of liability may have expired. Another problem arises when a consumer loses his or her wallet that contains the tokens. Loss of multiple tokens may require the prompt notification of several financial institutions or retailers to avoid assessment of charges arising from unauthorized use of the tokens.

Consequently, what is needed is a financial transaction system that does not require a consumer to have a token to support a transaction.

What is needed is a financial transaction system that does not require a consumer to have a separate financial account identifier for each account maintained by a consumer.

SUMMARY OF THE INVENTION

The above-noted limitations of previously known systems and methods for implementing financial transactions have been overcome by a system and method that operate in accordance with the principles of the present invention.

The system of the present invention for supporting transactions billed to an account associated with a cellular telephone comprises a merchant terminal for generating and sending merchant transaction data, a transaction consumer data receiver for receiving consumer transaction data from a cellular telephone at the transaction site, and a transaction processor for processing the merchant transaction data and the consumer transaction data to access a financial account so that approval for a transaction at the transaction site may be obtained. This system takes advantage of the almost ubiquitous presence of cellular telephones among the consuming public. The merchant terminal operates in a known manner to record data regarding items being purchased by a consumer and generates a total amount for the transaction. The total amount, a transaction code, and a telephone number for payment processing may then be displayed for the consumer. The consumer then uses his or her cellular telephone to call the displayed number and enter the transaction code. Substantially simultaneously with the display of this data, the merchant terminal sends merchant transaction data to the payment processing site. Receipt of the telephone call at the processing site provides the cellular telephone number and manufacturer's identification number for the telephone. Entry of the transaction code by the caller permits the processing site to correlate the consumer cellular telephone data with the merchant transaction data received from the merchant terminal and generate a transaction record.

The payment processing site may then use the transaction record to query a database of cellular telephone account numbers and charge the transaction to the consumer's cellular telephone account, if it exists. The data for the charges come from the merchant transaction data. The processing site may then generate an electronic funds transfer (EFT) message to transfer funds from the cellular telephone payment processor to the merchant account identified by the merchant transaction data. Such a transfer of funds may be done through an automatic clearinghouse (ACH) for financial institutions. Once the processing site has verified that an account associated with the cellular telephone number may be used to effect payment for the transaction to the merchant account, the processing site sends an approval code to the merchant terminal so the merchant terminal may issue a receipt for the items purchased and release the items to the consumer. Additionally, the approval code may be transmitted through the cellular telephone network to the cellular telephone at the transaction site so the consumer may verify the authorization for the transaction charges.

The system of the present invention may be implemented with a terminal that includes a transaction data generator for generating transaction data, and a transaction data display for displaying the generated transaction data with a telephone number so that a consumer may call the telephone number to bill a transaction corresponding to the generated transaction data to an account associated with a cellular telephone number. The terminal preferably includes a transaction data transmitter for transmitting the generated transaction data with merchant data to a payment processing site for approval of the transaction. Most preferably, the terminal displays the transaction data for the consumer with a menu of payment options. In response to the consumer selecting the option to pay through an account associated with a cellular telephone, the terminal displays the telephone number for the payment processing site so the consumer may make the call to commence transaction approval.

A system at the payment processing site of the present invention may include a transaction merchant data receiver for receiving merchant transaction data from a merchant terminal at a transaction site, a transaction consumer data receiver for receiving consumer transaction data from a cellular telephone at the transaction site, and a transaction processor for processing the merchant transaction data and the consumer transaction data to access a financial account so that approval for a transaction at the transaction site may be obtained. The transaction processor preferably includes a transaction record generator for generating a transaction record from the merchant transaction data and the consumer cellular telephone data. The transaction record may be used to query for an account associated with the cellular telephone data.

The method of the present invention includes generating a transaction record from merchant transaction data and consumer cellular telephone data, querying for payment through an account associated with the cellular telephone data, and generating an approval code in correspondence with a response to the query for payment through the account associated with the cellular telephone data. The method may also include displaying the telephone number of the processing site on the merchant terminal display so the consumer may call the processing site and commence authorization for transaction payment through an account associated with a cellular telephone number. Additionally, an payment option menu may be displayed so the consumer may elect to pay for the transaction through a cellular telephone account. In response to such election, a telephone number for the payment processing site may be displayed.

It is an object of the present invention to provide a consumer access to a financial account associated with a cellular telephone number for the purposes of paying for a transaction.

It is an object of the present invention to reduce the need for a consumer to carry tokens to implement payment for consumer transactions.

It is an object of the present invention to facilitate consolidation of transaction charges into the billing records of a commonly used service apparatus.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
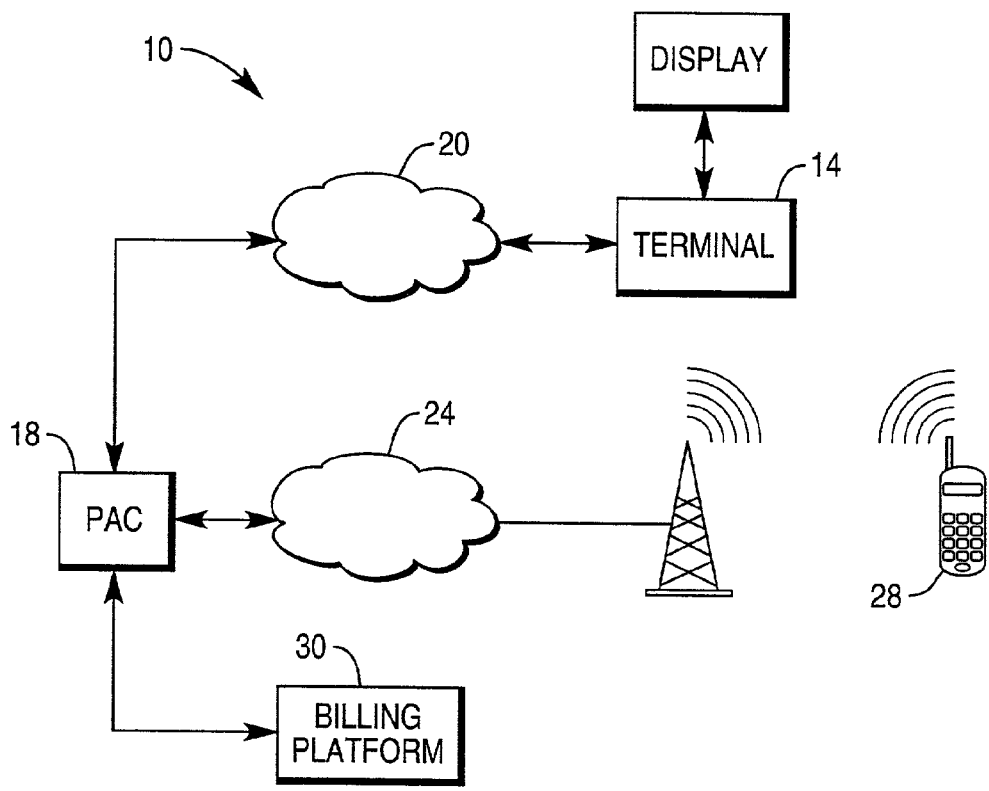
FIG. 1 depicts a block diagram of a system that may be used by a consumer to pay for a transaction through an account associated with a cellular telephone.

A system using one or more components of the present invention to support payment of a consumer transaction through an account associated with a cellular telephone number is shown in FIG. 1. System 10 may include a merchant terminal 14 that is coupled to a payment authorization center (PAC) or payment processing site 18 through a communication link 20. Communication link 20 may be a public or a private communication network such as a public switch telephone network, the internet, a proprietary wide area network (WAN), any combination of such known communication networks, or the like. A consumer at the transaction site where merchant terminal 14 is located may communicate with PAC 18 through cellular network 24 by using a cellular telephone 28. Cellular network 24 is a network of cellular sites and land lines through which a consumer may call a telephone number associated with PAC 18. The operator of cellular network 24 is typically known as a wireless carrier.

Cellular network 24 includes routers and switches that have databases containing records that identify the authorized users of network 24. These records contain the telephone numbers authorized for use on network 24, the electronic serial numbers (ESN) corresponding to an authorized telephone number, and identification of the billing platform for the authorized telephone number/ESN combination. A billing platform is a business entity that pays the charges for use of the cellular network incurred through use of an authorized telephone number/ESN combination. Because payment of network charges are typically paid by consumers in arrears, the billing platform approves the consumer responsible for charges to a particular telephone number/ESN combination after the consumer has submitted proof of creditworthiness. Thus, the account for payment of cellular network services is a type of credit account. The present invention may be used to extend the charges that may be billed against a billing platform account to include consumer transaction charges. The charges for the telephone call to PAC 18 are processed in a known manner through the routers and switches of network 24 communicating with the databases maintained by a billing platform 30 for that purpose. The consumer transaction charges are processed through PAC 18 for use with billing platform system 30.

Figure 2:
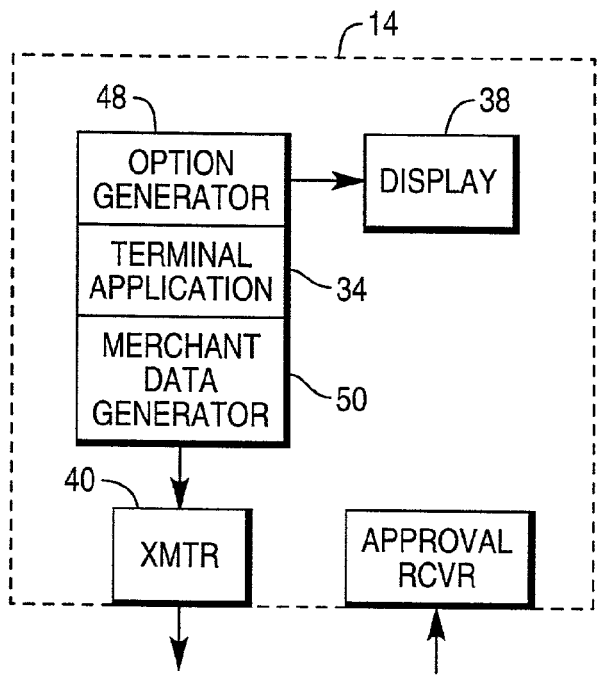
FIG. 2 is a block diagram of a merchant terminal shown in FIG. 1.

Merchant terminal 14 may be a point-of-sale (POS) terminal, a credit card terminal, or other computer implemented device in which transaction data may be entered and stored. As a POS terminal, terminal 14 may either be a cashier-assisted POS terminal or a self-checkout terminal. Preferably, terminal 14 is coupled to PAC 18 through communication link 20. PAC 18 may be coupled to terminal 14 through an open network, such as the internet, a proprietary WAN or LAN network, or through a point-to-point communication system, such as the public switched telephone network (PSTN) or some combination thereof. A block diagram of an exemplary implementation of terminal 14 is shown in FIG. 2. Terminal 14 includes a terminal application 34, a display 38, a merchant transaction data transmitter 40, and a payment approval receiver 44. Terminal application 34 includes the processor, program and data memory, and I/O peripheral devices necessary to operate terminal 14 in a known manner. The present invention may be implemented with additional programming so the processor of application 34 may control the operation of terminal 14 to support payment of consumer transactions through an account associated with a cellular telephone number. Transaction data identifying items being purchased by a consumer and the prices of the items are obtained from data entry devices such as a keyboard, bar code reader or scanner, and the like. Application 34 provides item identification and prices to display 38 during the entry of the item data. The item identification data and price data are obtained from an internal memory of terminal 14, from a database coupled to terminal 14, or a combination thereof. Upon entry of the last item data, the processor for application 34 signals display 38 to display a total amount due from the consumer, a telephone number or internet protocol (IP) address corresponding to PAC 18, and a transaction code. Alternatively, display 38 may include a payment option generator 48 that generates a menu of payment options and the menu is displayed by display 38. If the consumer selects the payment by cellular phone option, the telephone number for PAC 18 and the transaction code are displayed. Preferably, the number or IP address displayed for the consumer's call corresponds to the terminal at which the transaction is occurring, although such correspondence is not required for an implementation to be within the scope of the present invention.

The total amount due may then be combined with a merchant identification code and transaction identification code by merchant data generator 50 to generate merchant transaction data. The merchant identification may include an identification code for the retailer, the store, the city and state of the store location, and the terminal. For example, the merchant identification code 'KMST57GADULT2' may be broken down into a retailer code ('KM'=K-Mart), a store code ('ST57'=Store 57), a state code ('GA'=Georgia), a city code ('DUL'=Duluth), and a terminal code ('T2'=Terminal 2). Such a code compilation is merely exemplary and the principles of the present invention are not limited to such a code. The transaction identification code permits PAC 18 to correlate the merchant transaction data with consumer cellular telephone data as described below. Transaction data generator 50 may be a program component of application 34 or it may be a separately implemented component through a processor and memory or ASIC. The merchant transaction data may then be provided to merchant transaction data transmitter 40 for sending to PAC 18. If desired, merchant data may also include terminal identification, date/time data, and other transaction related data that may be used to identify the transaction or more fully describe it.

Figure 3:
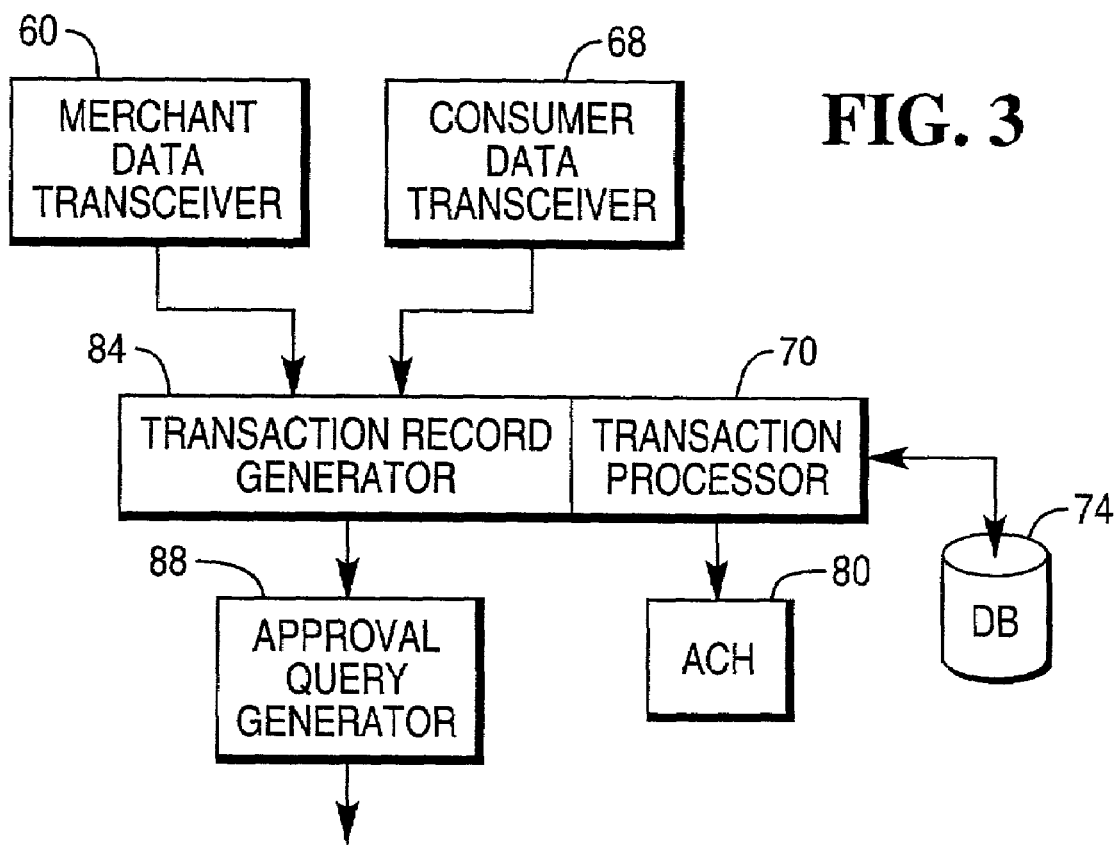
FIG. 3 is a block diagram of a processing site for approving payment for a transaction through an account associated with a cellular telephone.

A block diagram of an exemplary embodiment of PAC 18 is shown in FIG. 3. PAC 18 includes a merchant data transceiver 60, a consumer data transceiver 68, and a transaction processor 70. Transaction processor 70 controls the operation of PAC 18 and may be a host server or the like. Operations of processor 70 for purposes of implementing the present invention are discussed more fully below. Merchant data transceiver 60 receives the merchant transaction data sent by terminal 14 through communication link 20 and provides it to transaction processor 70. Transceiver 60 also communicates an approval code and amount to terminal 14. Likewise, transceiver 68 communicates data between a consumer and processor 70.

In response to the display of the telephone number for PAC 18, a consumer uses his or her cellular telephone 28 to call the displayed number or to access the IP address through cellular network 24. The cellular telephone transmits the telephone number assigned to telephone 28, the ESN of telephone 28, and the number to call, that is, the number displayed on display 38. Routers and switches in cellular network 24 use the telephone number and ESN to interrogate databases to confirm a billing platform account for the charges to route the call. At PAC 18, consumer data receiver 68, that may be a voice response unit, automated telephone attendant, open network server, or the like, answers the call and queries the consumer for a transaction code. The consumer enters the transaction code using the keypad of cellular telephone 28. Transceiver 68 is also capable of receiving the telephone number and ESN from cellular network 24. The telephone number, ESN, and transaction code comprise the consumer transaction data. Of course, the consumer may enter other data to more fully identify or describe the transaction, if desired. For example, the consumer may be prompted to enter the merchant identification code including the terminal identifier. This is particularly advantageous if the telephone number called corresponds to the terminal so the consumer data receiver may verify that the call being processed corresponds to the appropriate terminal for that number. The consumer may also be prompted for the total amount of the transaction for further verification of the correlation of the consumer data being received via consumer data transceiver 68 and the merchant data being received through merchant data transceiver 60.

Transaction processor 70 is coupled to a database server that manages database 74. The database server and database 74 may be a relational database system or an object repository system. Clearinghouse network 80 may be any known financial clearinghouse network, such as the Automatic Clearinghouse (ACH), used to communicate electronic funds transfer (EFT) messages between financial institutions. The retailer and store codes in the exemplary merchant identification code discussed above may be used to query database 74 for a merchant account, that is preferably a deposit-only account, for payment purposes.

Processor 70 may include a transaction record generator 84. Transaction record generator 84 receives the transaction merchant data from transceiver 60 and the transaction consumer data from transceiver 68. Transaction record generator 84 verifies that the merchant data and the consumer data correspond to the same transaction through comparison of the merchant identification code, if entered by the user, the transaction code, and the total amount, if entered by the user. Once the merchant and consumer transaction data for the same transaction have been correlated, a transaction record is generated to determine whether payment for the transaction is approved. Preferably, billing platform 30 for a wireless carrier service pays the merchant and bills the wireless service account of the consumer, although other credit service entities may be queried for approval. For example, transaction record generator 84 may use the consumer cellular telephone number and ESN to query database 74 to retrieve records corresponding to the consumer from database 74. These records may identify one or more credit or payment services that the user may access for payment of a transaction. If more than one credit service is available to a user, a menu is provided to the consumer at the cellular telephone 28 through transceiver 68 and network 24. Selection of a payment service through the keypad of cellular telephone 28 is provided to record generator 84 through transceiver 68 and network 24.

Transaction record generator 84 may generate an approval query or it may include an approval query generator 88 to generate an approval query. The approval query identifies the amount of the transaction and the consumer associated with cellular telephone 28 used to communicate with PAC 18 for a particular transaction. If the entity being queried generates the EFT messages to effect payment then the transaction record also includes the merchant's deposit-only account. The approval query is sent to the billing platform for cellular network 24 or to the credit or payment service selected by the consumer. The billing platform or payment service then determines whether to approve the payment for the transaction in a known manner and returns an approval code to query generator 88. The approval code may be then provided to merchant transceiver 60 for transmission to terminal 14 and may also be provided to transceiver 68 for transmission to cellular telephone 28. The consumer and/or cashier may take appropriate actions based upon the status of the approval code. For example, terminal 14 issues a receipt and releases the goods to the consumer if the status of the approval code indicates the payment request has been approved. A status indicating denial of the payment request may result in the user attempting to access another payment service through PAC 18 if database 74 contains more than one payment service that may be accessed by the consumer.

In response to an approval code indicating authorization for the charges, transaction processor 70 may generate an EFT message for the transfer of funds from an account of the billing platform or payment service to the account corresponding to the merchant identification code if PAC 18 is authorized to generate such messages. Otherwise, the approval code indicates that the billing platform or credit service has generated such a message and that PAC 18 need only communicate the approval code to the consumer and merchant terminal 14. If PAC 18 is authorized to generate EFT messages they are sent to ACH 90 to effect transfer of the funds. Otherwise, the EFT messages to effect payment for charges are generated and sent to ACH 80 by billing platform 30 or a credit service.

Figure 4:
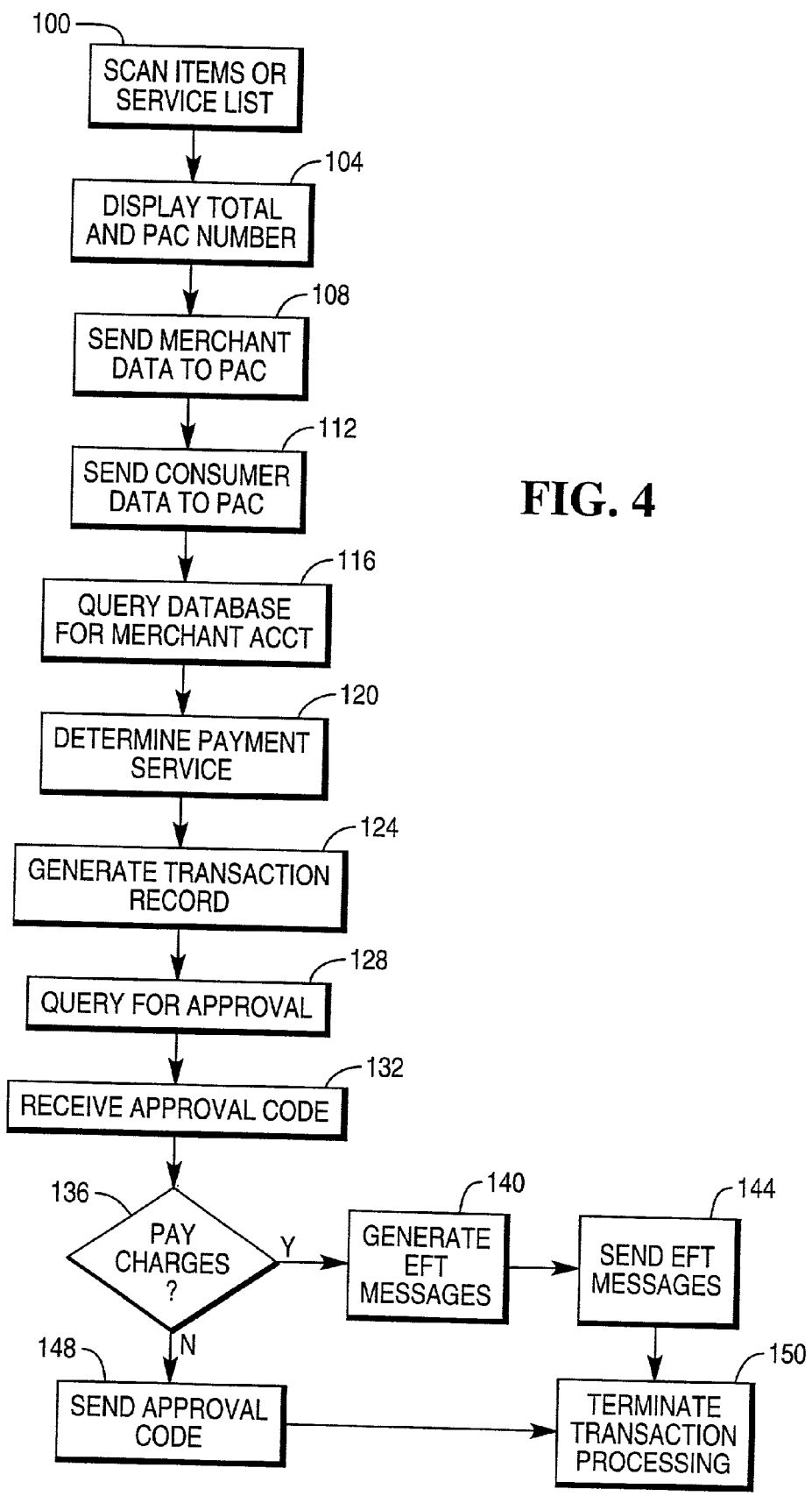
FIG. 4 is a flowchart of an exemplary method for supporting payment of a transaction through an account associated with a cellular telephone.

An exemplary method that conforms with the principles of the present invention is shown in FIG. 4. The process begins with a consumer bringing a group of items to a terminal 14 for purchase or a list of services, such as a restaurant bill. The items are scanned or data entered via a keyboard for item/service identification at display 38 along with its corresponding price (block 100). When all of the items or services have been scanned or otherwise entered, a total including taxes or any other requisite charges and/or discounts is displayed with a number for communicating with PAC 18 (block 104). As noted above, a menu may be presented listing payment options before the PAC number is displayed. Terminal 14 sends the merchant transaction data to PAC 18 for processing (block 108) and the consumer uses cellular telephone 28 to provide consumer transaction data to PAC 18 through cellular network 24 (block 112). Using the merchant transaction data, a database is queried for merchant account data (block 116) and the consumer transaction data is used to identify the payment service for the charges (block 120). As noted previously, the payment service identification may include a menu selection by the consumer for that purpose. The merchant and consumer data may be used to generate a transaction record (124) that correlates the merchant and consumer transaction data. This correlation may also include payment service and merchant account data. The transaction record is used to query for transaction approval (block 128). Upon receipt of an approval code (block 132), the method continues by determining whether EFT messages to pay the charges are required (block 136). If they are, the EFT messages for transferring funds from a payment service account to merchant account are generated and sent to the appropriate clearinghouse to effect payment (blocks 140, 144). If no EFT messages are required, the approval code may be returned to terminal 14 and the consumer (block 148). Unless the consumer is given another opportunity to seek approval in response to denial of a payment request, transaction processing is terminated (block 150).

The system and method of the present invention may be implemented by adding functionality to an existing merchant terminal. That is, hardware and software may be added to existing terminals to display a number for a PAC, communicate data with a PAC, and appropriately respond to an approval code. Likewise, existing payment host or billing platform systems may be easily modified to communicate with a consumer for purposes of billing charges to an account for cellular telephone charges or to another payment or credit service account. A billing platform, a third party entity, a merchant, or a payment/credit service entity may operate PAC 18. Generation of EFT messages by PAC 18 depends upon whether PAC 18 is operated by the entity that pays the charges for the consumer or simply coordinates the payment request messages and approval communications responding to such messages.

The system and method of the present invention enable a consumer to access a financial account managed by a PAC without any token or data other than that supplied by the cellular telephone of the consumer and data entered by the consumer through the phone. This system and method alleviates the need for the consumer to carry multiple tokens for access to financial accounts. Instead, the present invention utilizes the presence of cellular telephones prevalent in society today to reduce the need for payment service tokens. As a consequence, the likelihood of token loss and abuse are reduced.

While the present invention has been illustrated by the description of exemplary processes and system components, and while the various processes and components have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for supporting consumer transactions billed to an account through a cellular telephone comprising:
 a merchant data receiver for receiving merchant transaction data from a merchant terminal at a transaction site;
 a consumer data receiver for receiving consumer transaction data from a cellular telephone of a consumer at the transaction site; and
 a transaction processor for processing the merchant transaction data and the consumer transaction data to access a financial account so that approval for a transaction at the transaction site may be obtained and for generating a transaction record using the merchant transaction data and the consumer transaction data.

2. The system of claim 1, the transaction processor further comprising:
 an approval query generator that queries for approval of the transaction at the transaction site using the generated transaction record.

3. The system of claim 2 further comprising:
 an approval transmitter for transmitting an approval code to one of the cellular telephone and the merchant terminal at the transaction site in response to a response to the query from the approval query generator.

4. A terminal for supporting consumer transactions billed through an account through a cellular telephone comprising:
   a transaction data generator for generating transaction data; and
   a transaction data display for displaying the generated transaction data with a telephone number so that a consumer may call the telephone number to bill a transaction corresponding to the generated transaction data to an account associated with a cellular telephone number.

5. The terminal of claim 4 further comprising:
   a transaction data transmitter for transmitting the generated transaction data with merchant data to a payment processing site for approval of the transaction.

6. The terminal of claim 4 further comprising:
   an option payment generator for generating a menu of payment options for the transaction data display to display, the generated menu including an option to pay for a transaction corresponding to the generated transaction data by means of an account associated with a cellular telephone.

7. The terminal of claim 5 further comprising:
   an approval receiver for receiving an approval code for a transaction corresponding to the transaction data transmitted by the transaction data generator so that the transaction corresponding to the transaction data is funded by an account associated with a cellular telephone number.

8. A system for supporting transactions billed to an account associated with a cellular telephone comprising:
   a merchant terminal for generating and sending merchant transaction data over a first communication link;
   a consumer data receiver for receiving over a second communication link consumer transaction data from a cellular telephone at the transaction site; and
   a transaction processor for processing the merchant transaction data and the consumer transaction data to access a financial account so that approval for a transaction at the transaction site may be obtained and for generating a transaction record using the merchant transaction data and the consumer transaction data.

9. The system of claim 8, the transaction processor further comprising:
   an approval query generator that queries for approval of the transaction at the transaction site using the generated transaction record.

10. The system of claim 9 further comprising:
    an approval transmitter for transmitting an approval code to one of the cellular telephone and the merchant terminal at the transaction site in response to a response to the query from the approval query generator.

11. The system of claim 8, the merchant terminal further comprising:
    a transaction data generator for generating transaction data; and
    a transaction data display for displaying the generated transaction data with a telephone number so that a consumer may call the telephone number to bill a transaction corresponding to the generated transaction data to an account associated with a cellular telephone number.

12. The system of claim 11, the merchant terminal further comprising:
    a transaction data transmitter for transmitting the generated transaction data with merchant data to a payment processing site for approval of the transaction.

13. The system of claim 12, the terminal further comprising:
    an option payment generator for generating a menu of payment options for the transaction data display to display, the generated menu including an option to pay for a transaction corresponding to the generated transaction data by means of an account associated with a cellular telephone.

14. The system of claim 13, the terminal further comprising:
    an approval receiver for receiving an approval code for a transaction corresponding to the transaction data transmitted by the transaction data generator so that the transaction corresponding to the transaction data is funded by an account associated with a cellular telephone number.

15. A method for supporting payment of a consumer transaction through an account associated with a cellular telephone comprising:
    displaying a telephone number at a transaction site using a merchant display;
    establishing a communications link including the consumer cellular telephone using the displayed telephone number;
    receiving consumer cellular telephone data from the communications link including the consumer cellular telephone;
    generating a transaction record from merchant transaction data and the consumer cellular telephone data;
    querying for payment through an account associated with the cellular telephone data using the generated transaction record; and
    generating an approval code in correspondence with a response to the query for payment through the account associated with the cellular telephone data.

16. The method of claim 15 further comprising:
    generating merchant transaction data to identify a merchant and a consumer transaction at a transaction site.

17. The method of claim 16 further comprising:
    sending the generated approval code to one of the cellular phone and a merchant terminal located at the transaction site.

18. The method of claim 15 wherein the telephone number is displayed in response to an option to pay for the consumer transaction through an account associated with the cellular telephone being selected.

19. The method of claim 18 wherein the merchant transaction data generation includes identifying a merchant account so that funds may be transferred from the account associated with the cellular telephone number to the merchant account.

20. A method of processing data used to obtain approval for a payment associated with a transaction comprising:
    receiving from a merchant terminal at a transaction site merchant transaction data;
    receiving from a cellular telephone associated with a consumer at the transaction site, through a communications link established during the transaction, consumer transaction data identifying the transaction;
    correlating the received merchant transaction data and the received consumer transaction data identifying the transaction; and
    using the correlated data to obtain approval to charge a payment associated with the transaction to an account associated with the cellular telephone.

21. The method of claim 20, further comprising:
generating at least some of the merchant transaction data using a cost of a product selected by the consumer.

22. The method of claim 21, further comprising:
generating at least some of the consumer transaction data identifying the transaction using the merchant terminal; and
displaying the at least some of the consumer transaction data identifying the transaction.

23. A system for supporting consumer transactions billed to an account through a cellular telephone comprising:
a merchant data receiver for receiving merchant transaction data from a merchant terminal at a transaction site over a first communications link;
a consumer data receiver for receiving an incoming call from a consumer cellular telephone at the transaction site over a second communications link and for receiving consumer transaction data from the consumer cellular telephone; and
a transaction processor for processing the merchant transaction data and the consumer transaction data to access a financial account so that approval for a transaction at the transaction site may be obtained.

24. The system of claim 23, further comprising:
a display for displaying a telephone number so that a consumer may call the telephone number to bill the transaction to an account associated with a telephone number associated with the cellular telephone.

* * * * *